United States Patent
Lee et al.

(10) Patent No.: US 8,905,081 B2
(45) Date of Patent: Dec. 9, 2014

(54) SAFETY RESTRAINT SYSTEM FOR HIGH PRESSURE FLOW LINES

(75) Inventors: Patrick Lee, Gainesville, TX (US); Jeff Isbell, Valley View, TX (US); Stormy Lee, Mansfield, TX (US); Cory Enderby, Gainesville, TX (US); Guy Ellis, Sanger, TX (US)

(73) Assignee: LLI Safety Systems, LLC, Gainesville, TX (US)

( * ) Notice: Subject to any disclaimer, the term of this patent is extended or adjusted under 35 U.S.C. 154(b) by 0 days.

(21) Appl. No.: 13/531,681

(22) Filed: Jun. 25, 2012

(65) Prior Publication Data

US 2013/0341470 A1 Dec. 26, 2013

(51) Int. Cl.
  *F16L 3/00* (2006.01)
(52) U.S. Cl.
  USPC .............. 138/107; 138/106; 285/117; 248/49
(58) Field of Classification Search
  USPC .................. 138/106, 107; 137/377; 285/117; 248/544, 49
  See application file for complete search history.

(56) References Cited

U.S. PATENT DOCUMENTS

| | | | |
|---|---|---|---|
| 3,813,733 A | 6/1974 | Flohr | |
| 3,859,692 A | 1/1975 | Waterman et al. | |
| 4,549,332 A | 10/1985 | Pouliot | |
| 5,507,533 A | 4/1996 | Mumma | |
| 5,689,862 A | 11/1997 | Hayes et al. | |
| 6,481,457 B2 | 11/2002 | Hayes et al. | |
| 7,574,967 B2 * | 8/2009 | Smith | 109/50 |
| 7,814,938 B2 * | 10/2010 | Davis et al. | 138/106 |
| 8,132,595 B2 * | 3/2012 | Gayaut | 138/107 |
| 2008/0283137 A1 * | 11/2008 | Davis et al. | 138/103 |

OTHER PUBLICATIONS

Temporary Pipeworks Restraint System (TPR System), FMC Technologies, Apr. 2009, Houston, Texas, US, www.fmctechnologies.com.

* cited by examiner

*Primary Examiner* — Bradley Duckworth
(74) *Attorney, Agent, or Firm* — Ross Barnes LLP; Monty L. Ross; Robin L. Barnes

(57) ABSTRACT

A safety restraint system for a flow line for pressurized liquids, comprising a plurality of axially spaced flow line wraps each having end loops that are releasably connected to an anchor line, the anchor line being further attached at each of its two ends to a relatively immobile anchor structure, and each flow line wrap being removable from the flow line and from the anchor line without detaching either end of the anchor line from its respective anchor structure.

5 Claims, 4 Drawing Sheets

SAFETY RESTRAINT SYSTEM FOR HIGH PRESSURE FLOW LINES

BACKGROUND OF THE INVENTION

1. Field of the Invention

This invention relates to high pressure lines such as those through which drilling and fracturing fluids are pumped under high pressures into a well bore through temporary installations located at pad sites during oil and gas drilling operations. More particularly, the invention relates to a safety restraint system that will protect workers and surrounding equipment from serious personal injury or damage if a union connection or other coupling between adjacent sections of flow line fails during use.

2. Description of Related Art

At drilling sites for oil and gas wells, high pressure fluids are commonly pumped downhole through flow lines that are connected to the discharge ends of pumps disposed on semi-trailers parked at the well site. When a flow line containing fluids under high pressure fails or separates accidentally, particularly if such separation occurs at one of the couplings disposed between adjacent tubing sections that typically make up such flow lines, the pressurized side of the tubing is suddenly free and can whip around violently as the pressurized fluid is discharged from the free end. This presents a serious risk and cause injury to workers and bystanders or damage to surrounding equipment.

The use of safety restraint systems for limiting the travel of a free end of a separate tubing section or hose, or for limiting the distance that two opposed free ends can separate relative to each other in case of a failure or separation while under pressure, are well known. Such devices and systems are disclosed, for example, in U.S. Pat. Nos. 3,813,733; 3,859,692; 4,549,332; 5,507,533; 5,689,862; 6,481,457; and in the Temporary Pipeworks Restraint (TPR) System disclosed by FMC Technologies in Houston, Tex.

For example, the safety restraint system disclosed in U.S. Pat. No. 6,481,457 comprises a continuous axial tether (which can further comprise a plurality of segments) that is substantially parallel to the flow line and is threaded through a plurality of axially spaced tethers wrapped around the flow line. In the TPR System disclosed by FMC, a plurality of restraint links, connector links and hitch pins. The restraint links are used to choke on piping termination points and extend down the length of the flow line being wrapped strategically around union connections and on swivel joint elbows. The connector links with integrated hitch pins are used to tie the restraint links together. TPR System discloses design ratings for flow line diameters ranging from 2 to 6 inches and operating pressures ranging from 10,000 to 20,000 psi.

Despite the benefits achieved through use of the systems and devices previously known, a new invention is disclosed herein that offers distinct advantages over such prior art.

SUMMARY OF THE INVENTION

A safety restraint system is disclosed herein that comprises a plurality of flow line wraps disposed axially spaced relation to each other along a pressurized flow line. In one embodiment of the invention, one such flow line wrap is disposed on each side of each union connection or other coupling between adjacent sections of the flow line and in such other axially spaced positions as may be deemed desirable. It should be understood for purposes of the present disclosure that "axially spaced" means spaced apart along the pressurized fluid flow path and does not require that the flow line containing the fluid flow be linear. Thus, for example, the fluid flow path may include turns, elbows, and inclined or snaking sections, but the flow line wraps of the invention shall still be considered to be "axially spaced" if they are spaced apart longitudinally along any part of the flow path. Each flow line wrap has opposed ends each terminating in a loop, and a plurality of closely spaced loops can be secured by shackles to a longitudinally extending anchor line that is secured at each end to a relatively permanent anchor structure.

The longitudinally extending anchor line can have opposed ends that terminate in a loop, and the anchor line can also comprise a plurality of sections. However, the overall length of each longitudinally extending anchor line is desirably such that it continuously spans the entire distance of the fluid flow through the fluid flow line between any two spaced apart anchor structures in substantially parallel and closely spaced relation to the fluid flow line. It should also be understood for purposes of the present disclosure that the term "anchor structure" can mean any structure disposed proximately to the fluid flow line that is relatively fixed and immobile relative to any portion of the fluid flow line that might become detached or severed during a period of use. Thus, for example, a structural member of a truck or trailer parked at a pad site and upon which a fluid pump is disposed can serve as an "anchor structure" for one end of a longitudinally extending anchor line of the present invention. Other representative anchor structures can include any fixed, permanent or semi-permanent structure that is temporarily or permanently mounted to the ground or to another piece of equipment in such manner that is can remain largely immobile in the event that a pressurized flow line ruptures or separates during use, thereby temporarily exerting a substantially increased force on the longitudinally extending anchor line of a subject safety restraint system.

A significant benefit of the safety restraint system of the invention over other safety systems and devices disclosed in the prior art is that the anchor line does not have to be threaded through any of the flow line wraps, meaning that any one or more of the flow line wraps can be replaced in any order if damaged or broken without having to disconnect either end of the anchor line from an anchor structure and unthreading and rethreading the anchor line through all of the flow line wraps.

BRIEF DESCRIPTION OF THE DRAWINGS

One embodiment of the safety restraint system of the invention is further described and explained in relation to the following figures of the drawings in which.

DETAILED DESCRIPTION OF AN EMBODIMENT OF THE INVENTION

Figure 2:
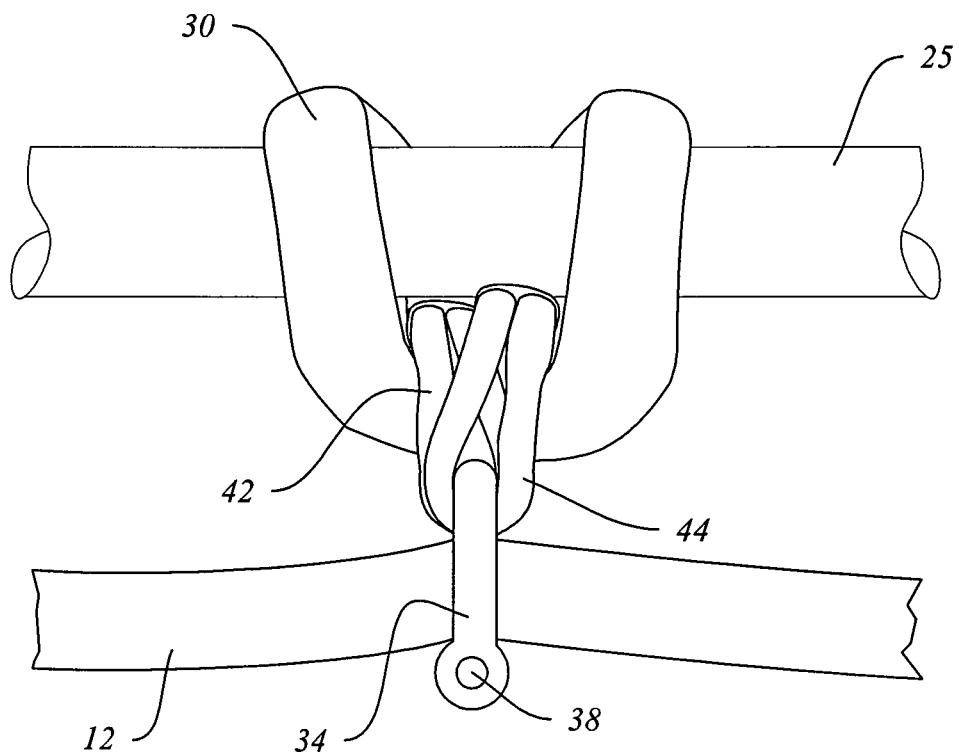
FIG. 2 is an enlarged detail view of one flow line wrap of the installation of FIG. 1, in which one shackle is connecting the flow line wrap to an intermediate section of the longitudinally extending anchor line.
Figure 3:
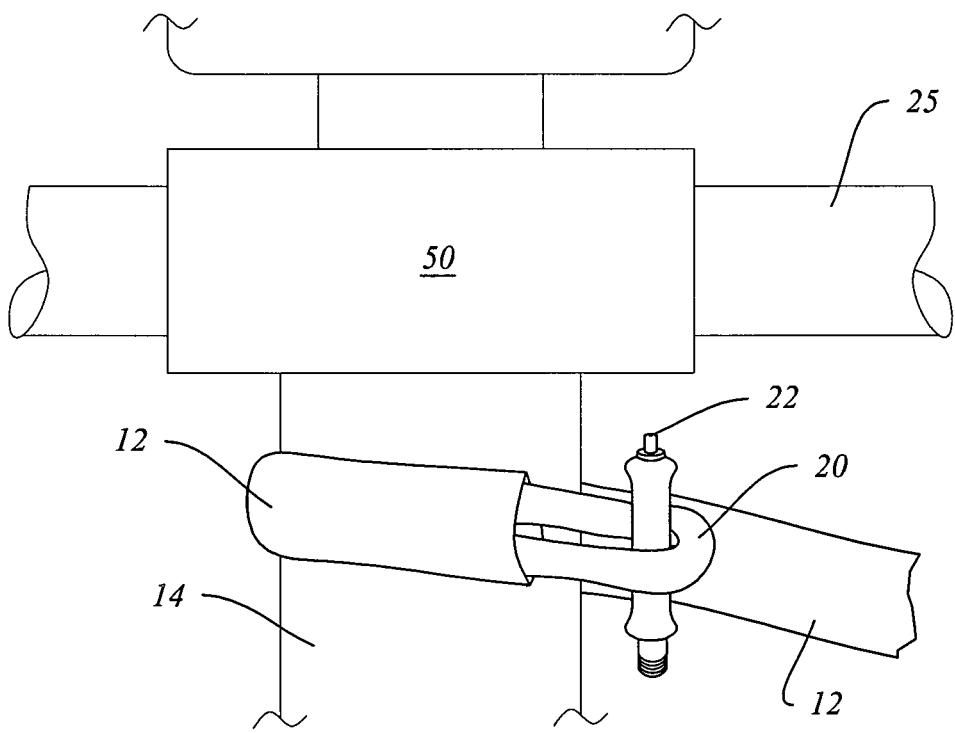
FIG. 3 is an enlarged detail view of one end of the longitudinally extending anchor line connected by a shackle to an anchor structure.
Figure 4:
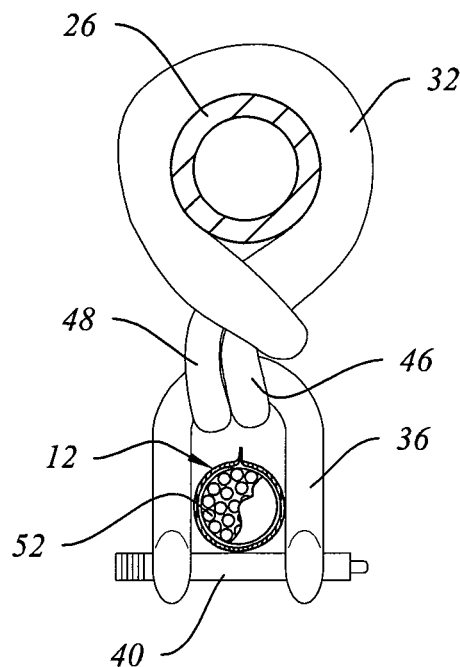
FIG. 4 is an enlarged, cross-sectional detail view taken along line 4-4 of FIG. 1.

Referring to FIGS. 1-4 and 6, one embodiment of safety restraint system 10 of the invention comprises longitudinally extended anchor line 12 having opposed end loops 20 that are wrapped around anchor structures 14, 16 and connected to anchor line 12 by shackles 22. Although a single wrap is shown, it will be appreciated by those of ordinary skill in the art upon reading this disclosure that multiple wraps can be used, that the particular anchor structures 14, 16 and their configurations can vary, and that connection devices similarly effective to shackles 22 can also be used in system 10 of the invention. Anchor line 12 desirably comprises a plurality of bundled, longitudinally extending flexible cords, strands or fibers as represented by strands 52 as shown in FIG. 4. Strands 52 can be made of any suitable known, durable material, such as polyester or another known polymeric composition, having tensile strength appropriate for the intended application. Strands 52 are desirably wrapped in or covered by any known flexible, durable cover material that is suitable for the intended use. A preferred application for safety restraint system 10 of the invention is for use with pressurized flow lines as previously described. Loops 20 are also made of a flexible, durable known material and are secured to the body of anchor line 12 by any known means that will provide loops with a tensile strength and tear resistance that is commensurate with the loading that would be encountered upon rupture of the pressurized fluid flow line sections 25, 26 to which anchor line 12 is attached.

Figure 1:
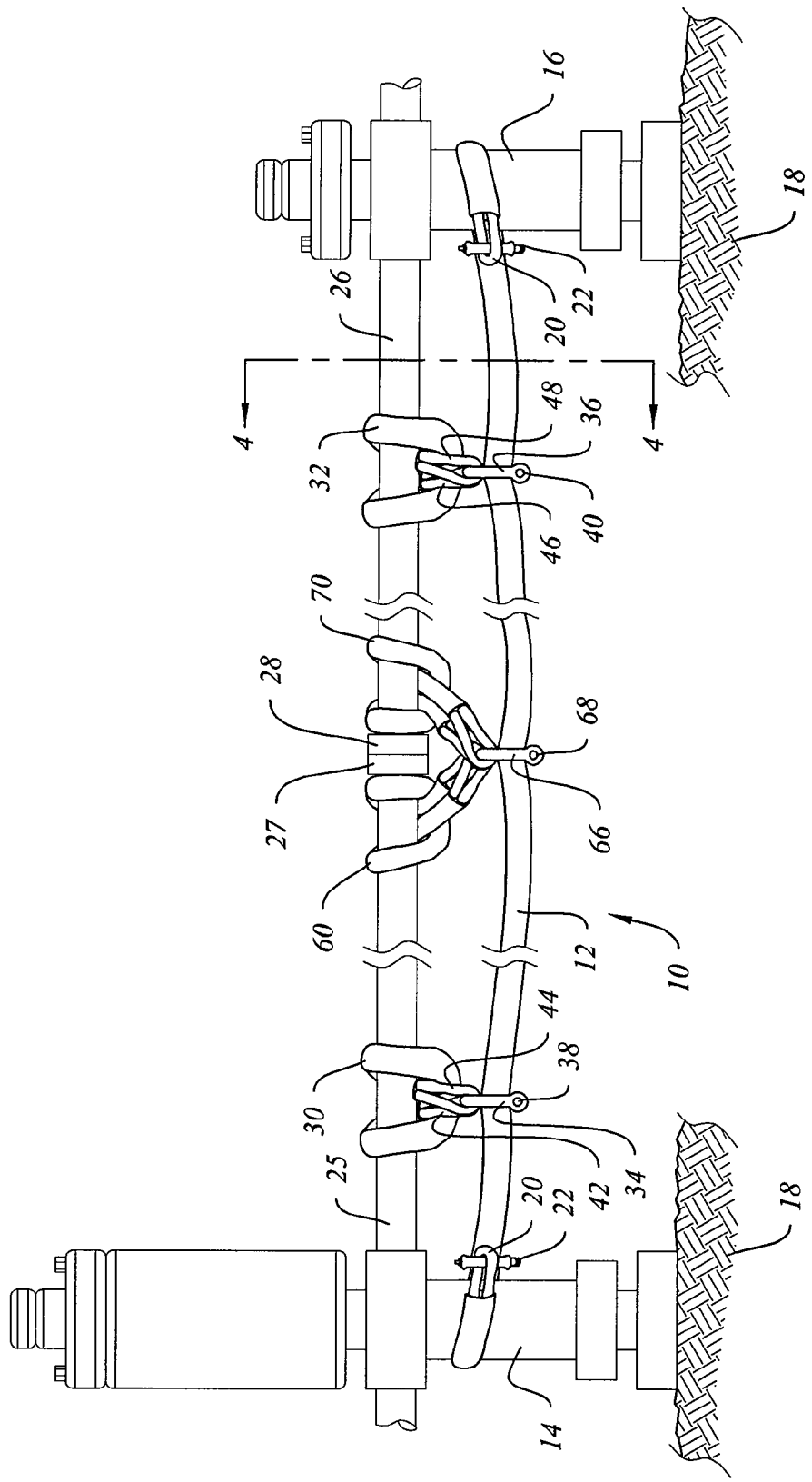
FIG. 1 is a front elevation view, partially broken away, of one embodiment of a safety restraint system of the invention as installed on a section of high pressure fluid flow line.

Referring again to FIGS. 1-4 and 6 generally, anchor line 12 is shown as being connected to flow line sections 25, 26 by a plurality of axially spaced apart flow line wraps 30, 32, 60 and 70 and a plurality of steel shackles 34, 36 and 66. It will be apparent to those of ordinary skill in the art upon reading this disclosure in relation to the accompanying drawings that the number and spacing of flow line wraps needed for a particular installation can vary according to factors such as, for example and without limitation, the length of the fluid flow line between anchor structures, the pressure and flow rate of the pressurized fluid contained within the fluid flow line, and the number of joints, unions or couplings between adjacent sections of the fluid flow line. As shown in FIG. 1, one flow line wrap 60, 70 is desirably disposed on each side of a union connection union comprising connectors 27, 28, and additional flow line wraps 30, 32 are intended to be indicative of a plurality of flow line wraps that would also likely be disposed between a plurality of connection unions or between a connection union and an anchor structure 14, 16. Shackles 22, 34, 36 and 66 as disclosed herein are preferably made of steel or another strong metal allow and and comprise a threaded pin as exemplified by pins 38, 40 and 68 in FIG. 1. It will be appreciated, however, that other similarly effective connector devices that are suitable for attaching end loops 20 of anchor line 12 and end loops 42, 44, 46, 48, 62 and 64 of flow line wraps 30, 32, 60 and 70 to anchor line 12.

Referring more particularly to FIG. 2, the structure and configuration of flow wrap 30 and loops 42, 44 at the opposed ends of flow line wrap 30 are desirably similar to those of longitudinally extending anchor line 12 and end loops 20. During installation, flow line wrap 30 is desirably folding in half so that the opposed end loops 42, 44 are side-by-side, after which the end loops are desirably wrapped around flow line section 25 and passed through the loop formed by flow line wrap 30. Shackle 34, with the threaded pin removed, is passed through each of loops 42, 44, after which shackle 34 is forced downwardly over and around anchor line 12. Threaded pin 38 is then replaced, thereby releasably capturing end loops 42, 44 of flow line wrap 30 and anchor line 12 within a single shackle 34. Although not shown in a detail view in the drawings, the installation procedure for flow line wrap 32 is identical, in that end loops 46, 48 of flow line wrap 32 are folded against each other, wrapped around flow line segment 26 and back through the loop created in the middle of flow line wrap 32. Pin 40 is removed and shackle 36 is then inserted through end loops 46, 48 and forced downward over and around anchor line 12, after which threaded pin 40 is replaced to releasably capture anchor line 12 inside shackle 40 together with end loops 46, 48 of flow line wrap 32.

Figure 6:
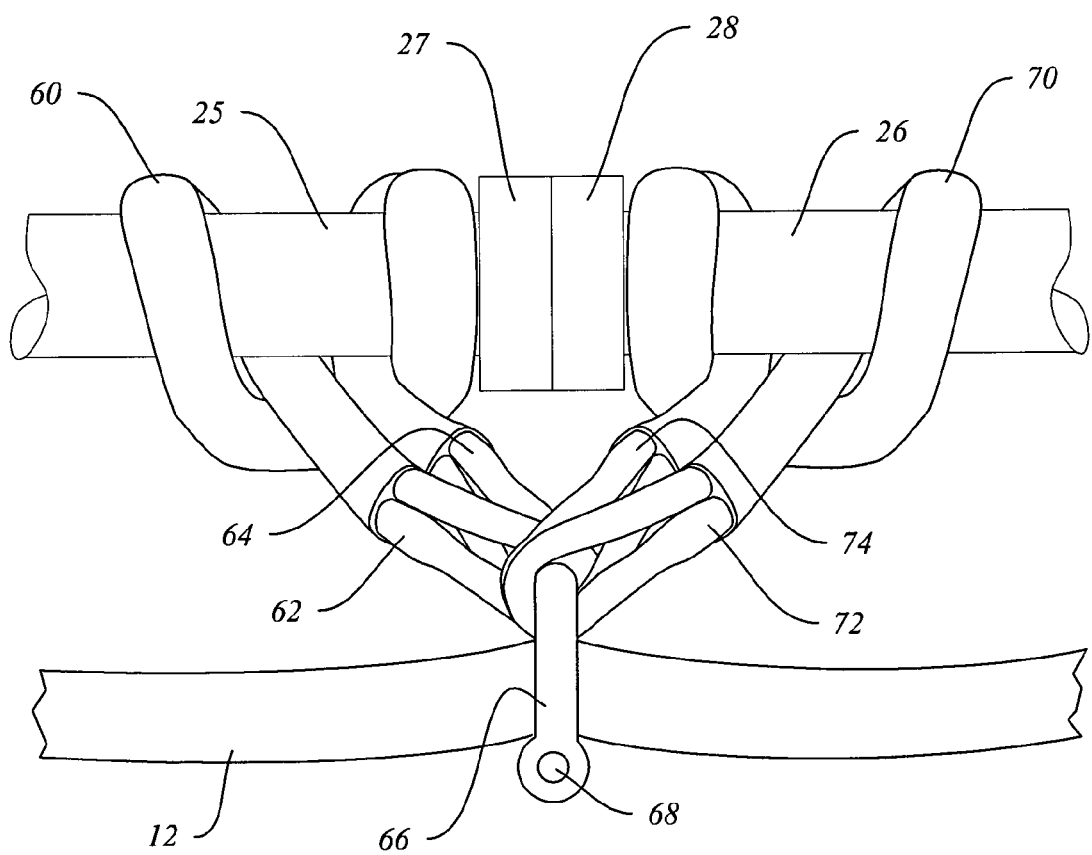
FIG. 6 is an enlarged detail view of two flow line wraps of the installation of FIG. 1 disposed on each side of a union connection, with one shackle connecting the four end loops of the two flow line wraps to an intermediate section of the longitudinally extending anchor line.

Referring more particularly to FIGS. 1 and 6, the application of safety restraint system 10 in the attachment of flow line wraps 60, 70 to opposite sides of union connection 27, 28 and the connection of end loops 62, 64, 72 and 74 to anchor line 12 is further described and explained. Each of flow line wraps 60, 70 is desirably folded in half so that the opposed ends 62, 64 and 72, 74 are cooperatively aligned, after which the ends are wrapped around flow line sections 25, 26, respectively and then passed back through the loop formed by folding each respective flow line wrap. Following removal of pin 68, shackle 66 is then desirably passed through each of loops 62, 64, 72 and 74, and forced downwardly over and around longitudinally extending anchor line 12. Threaded pin 68 is then replaced to releasably capture anchor line 12 and the end loops of both flow line wraps 60, 70 inside shackle 66. When installed in this manner, flow line wraps 60, 70 and anchor line 12 cooperate to limit the possible movement of the free ends of flow line sections 25, 26 following a separation of union connectors 27, 28.

Referring more particularly to FIGS. 1 and 3, end loop 20 of anchor line 12 is wrapped around upright pipe section 14, which is fixed in substantially immobile relation to the underlying ground or another foundation 18. With the pin removed, shackle 22 is passed through an end loop 20 of anchor line 12, and also around the major diameter of anchor line 12, thereby releasably capturing both end loop 20 and anchor line 12 within metal shackle 22.

Figure 5:
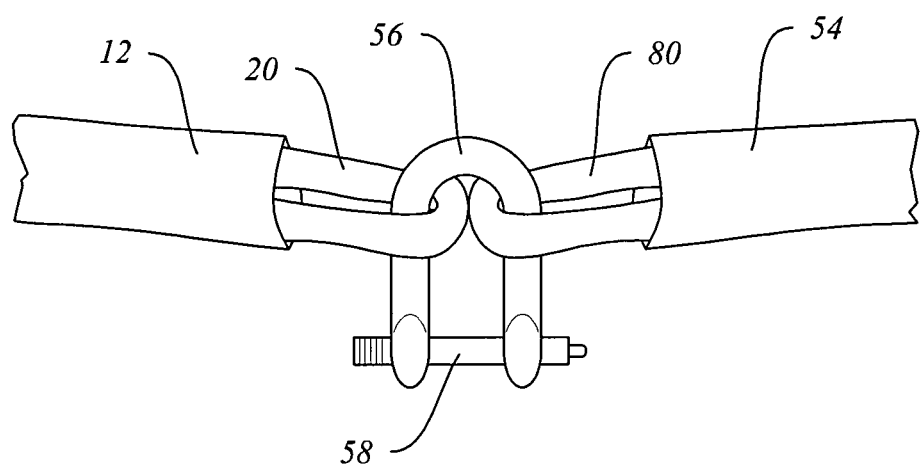
FIG. 5 is a detail view showing how one end of the longitudinally extending anchor line of FIG. 1 can be connected by a shackle to another section of longitudinally extending anchor line.

Referring to FIG. 5, another embodiment is disclosed in which adjacent end loops 20, 80 of anchor line sections 12, 54 are joined by passing metal shackle 56 or another similarly effective device, through end loops 20, 80 and inserting threaded pin 58 to releasably capture both end loops inside shackle 56.

Other alterations and modifications of the invention will likewise become apparent to those of ordinary skill in the art upon reading this specification in view of the accompanying drawings, and it is intended that the scope of the invention disclosed herein be limited only by the broadest interpretation of the appended claims to which the inventors are legally entitled.

We claim:
1. A safety restraint system for pressurized liquid flow lines, comprising:
a plurality of flow line wraps, each flow line wrap having two opposed end loops and being wrapped around a fluid flow line in axially spaced relation to each other in such manner that the two opposed end loops of each flow line wrap are cooperatively aligned and pass through an aperture created between the flow line wrap and the flow line;

a longitudinally extending anchor line having two ends and being disposed in substantially parallel relation to the fluid flow line between two spaced apart anchor structures, wherein each flow line wrap and the anchor line each comprise a bundle of longitudinally extending, polymeric strands or fibers; and a plurality of releasable connector devices, including a first connector device releasably connecting a first end of the anchor line to one of the two anchor structures and a second connector device releasably connecting a second end of the anchor line to another of the two anchor structures, and another connector device releasably connecting the two opposed end loops of each flow line wrap to the anchor line;

wherein the releasable connector devices releasably connecting the two opposed end loops of each flow line wrap to the anchor line allow any one of the plurality of flow line wraps to be disconnected from the anchor line and removed from the flow line without releasing either of the first and second ends of the anchor line from the respective anchor structure.

2. The safety restraint system of claim 1 wherein the flow line comprises a plurality of sections.

3. The safety restraint system of claim 2 wherein a union connection joins two adjacent flow line sections and wherein one flow line wrap is disposed adjacent to each side of the union connection and wherein a single connector releasably connects the end loops of both flow line wraps to the anchor line.

4. The safety restraint system of claim 1 wherein the releasable connector devices connecting the end loops of a flow line wrap to the anchor line are metal shackles.

5. The safety restraint system of claim 4 wherein each metal shackle comprises a threaded pin.

* * * * *